United States Patent [19]  
Goode et al.

[11] 4,323,990  
[45] Apr. 6, 1982

[54] SEISMIC EXPLORATION SYSTEM

[75] Inventors: James W. Goode, Dallas; Wayne A. Penner, Farmers Branch; Charles D. Ray, Dallas; Robert G. Nelson, Carrollton, all of Tex.

[73] Assignee: Mobil Oil Corporation, New York, N.Y.

[21] Appl. No.: 118,299

[22] Filed: Feb. 4, 1980

[51] Int. Cl.³ .......................... G01V 1/24; G01V 1/38
[52] U.S. Cl. .......................................... 367/21; 367/60; 367/74; 364/421; 364/200
[58] Field of Search .......................... 367/21, 60, 74; 364/421, 200, 900

[56] References Cited

U.S. PATENT DOCUMENTS

| | | | |
|---|---|---|---|
| 3,344,406 | 9/1967 | Vinal | 364/900 |
| 3,496,530 | 2/1970 | Brown et al. | 367/74 |
| 3,525,072 | 8/1970 | Barn et al. | 367/21 |
| 3,986,008 | 6/1976 | Fort et al. | 367/60 |
| 4,016,531 | 4/1977 | Cook et al. | 367/21 |
| 4,021,772 | 5/1977 | Cook et al. | 367/21 |
| 4,053,752 | 10/1977 | De John et al. | 364/200 |
| 4,084,151 | 4/1978 | Penner | 367/21 |
| 4,136,386 | 1/1979 | Annunziata et al. | 364/200 |
| 4,137,562 | 1/1979 | Boeck et al. | 364/200 |
| 4,202,048 | 5/1980 | Edwards | 367/60 |
| 4,224,474 | 9/1980 | Savit | 367/60 |

Primary Examiner—Nelson Moskowitz  
Attorney, Agent, or Firm—Charles A. Huggett; Michael G. Gilman; Frank J. Kowalski

[57] ABSTRACT

A seismic data generation and collection system is described for use in a exploration vessel for determining the subsea structure of the earth. A plurality of acoustic energy sources are towed behind the boat and acoustic waves are emitted therefrom by conventional means. The reflection at the subsea interfaces of the acoustic waves are picked up by the energy detectors which produce analog signals. These analog signals are then converted to digital data; multiple computers are used to reformat the data into a desired format. A real time monitor computer and monitor plotter may also be provided to assist the operator in evaluation of the operation of the system. The desired record format includes header information relating to the parameters under which the seismic shot was made, which may be written directly onto the magnetic tape containing the seismic data.

9 Claims, 9 Drawing Figures

SEISMIC EXPLORATION SYSTEM

FIELD OF THE INVENTION

This invention relates to the field of efficient storage of bulk digital data. More specifically, this invention relates to the field of storing seismic data generated by detecting reflections of acoustic waves from subsea formations.

BACKGROUND OF THE INVENTION

It has become common practice in the field of exploration for oil, gas, and other valuable minerals, to perform seismic exploration in the world's oceans. One common method of seismic exploration is to provide an exploration vessel with one or more compressed air "guns" which comprise tanks for the storage of highly compressed air which may be rapidly released so as to produce an acoustic wave in the water (a "shot"). The acoustic wave thus produced travels through the water to the bottom of the sea, continues through the sea bed and is partially reflected at the interfaces between layers of rock of different densities, back towards the surface where it may be detected by piezoelectric detectors towed behind the vessel. If a plurality of detectors are towed behind the vessel, the difference in time of detection of the reflection from the same interface can be used to calculate the depth of the interface. By providing a plurality of parallel detections in the same general region, therefore, the shape of the interface with respect to the surface of the sea can thus be calculated; and since certain interface formations are known to be conducive to the formation and/or accumulation of oil and gas, these seismic signals are a valuable tool in oil and gas exploration.

The general subject of seismic prospecting for oil and the processing which can be performed on the data thus gathered to lead to better information is the subject of numerous reference works in the field. The present invention is directed at means for efficient storage of the seismic data thus gathered.

It will be appreciated by those skilled in the art that seismic data recordation requires immense amounts of digital data storage since vast amounts of data are generated in the seismic exploration process. In the preferred embodiment discussed below, it will be disclosed that even using the most modern up-to-date high-data-density magnetic storage tapes, an entire reel of tape is filled with seismic data within about eleven minutes of seismic exploration running time. This is a vast quantity of data indeed and it therefore behooves the data storage system designer to store the data as economically as is possible and to prepare it as fully as practicable while detecting it for the processing which is eventually to be performed thereon on a land-based computer so as to save all possible fractions of computer time in advance. This motivation—to save as much time and to store the data as economically as possible—forms the framework within which the present invention is made.

Therefore, it has been the aim of the prior art to provide seismic data storage systems which are so designed as to arrange the data for economic computation thereon when the magnetic tapes containing the data are eventually returned to a home base computer for complete analysis. For example, in commonly assigned U.S. Pat. No. 4,016,531 to Cook et al, means are disclosed for rearranging the data from the serial by time of detection format in which the data is generated into a serial by trace format which is more economic for computation at a home base computer. Similarly, in commonly assigned U.S. Pat. No. 4,084,151 to Penner relatively simple computations are performed on the data while it is being reordered in accordance with the scheme of U.S. Pat. No. 4,016,531 referred to above. Both these disclosures are hereby incorporated by reference in the present application; their subject matter forms a part of the system within which the present invention is also designed to operate.

It will be appreciated by those skilled in the art that the more seismic data available from a given area, the better use can be made of the data by experienced geophysicists when analyzing the data in the search for oil. Therefore, it has been and remains an aim of the art to provide more and more acoustic energy detectors in the streamer towed behind the exploration vessel so that more data can thus be generated and more accurate results obtained. However, the provision of additional acoustic detectors means that more traces can be made available for recording. As more data is generated, the faster the computers on board the vessel must operate to rearrange the data, as well as to perform scaling and other arithmetic operations on it; it has been necessary to provide additional computing power on board the vessel in order that additional data generated by the additional acoustic energy detectors can be dealt with.

An additional aim of the art has been to provide automatic means for recording parameters relating to the circumstances under which the data was generated on the same tape on which the data itself is recorded; that is to say, it is desirable to provide a "header" for each record of data of an acoustic "shot" so that the tape may be self-identifying. Desirably each seismic record should include all navigational data, including the vessel's speed and heading, the general weather conditions, and any source of additional acoustic or electronic noise which might be detected. It would also include information as to the number of acoustic energy detectors being streamed behind the boat and the curvature of the streamer with respect to the vessel. Furthermore, it is desirable that the seismic record be provided with a space for operator comments; for example, the operator might note that noise was being generated by another vessel in the vicinity of the exploration vessel. Clearly it would be desirable to record this information directly on the tape so that it could be readily removed in the processing of the data.

OBJECTS OF THE INVENTION

It is therefore an object of the invention to provide a seismic data detecting and recording system which has the capability of detecting and storing seismic data in a format which is most economic for later processing.

It is a further object of the invention to provide a seismic data recordation system which has the capability of additional expansion later should such prove desirable.

It is a further object of the invention to provide a seismic data detection and recordation system which provides failsafe computing capability, yet which does not require undue multiplicity of similar parts.

It is still a further object of the invention to provide a seismic data recordation system which automatically supplies and records header information relating to the circumstances under which a given seismic data record was gathered, storing this information on the same tape as the seismic data itself.

Finally, it is yet a further object of the invention to provide a seismic data collection and recordation system with the capability of driving a real-time monitor indicating the actual seismic data being gathered and recorded.

SUMMARY OF THE INVENTION

The above needs of the art and objects of the invention are satisfied by the present invention, which comprises a seismic data recordation system which includes a plurality of digital computers each adapted to reformat seismic data into a form suitable for computation. The system is operated so that the plurality of digital computers each select alternating quantities of seismic traces from the incoming data stream, for processing, thus dividing the incoming data into quantities which can be handled by the individual digital computers. The invention further comprises means for providing at least one other computer which can be used as a backup reformatting computer in the event that one of the plurality of reformatting computers breaks down. The data interchange unit also includes means for formatting header information for the seismic data records which form the output of the recordation system of the invention.

BRIEF DESCRIPTION OF THE DRAWINGS

The invention will better understood if reference is made to the accompanying drawing in which:

FIG. 5 represents a schematic view of the flow of data between the various digital processing means which make up the system of the invention;

DESCRIPTION OF THE PREFERRED EMBODIMENTS

Figure 1:
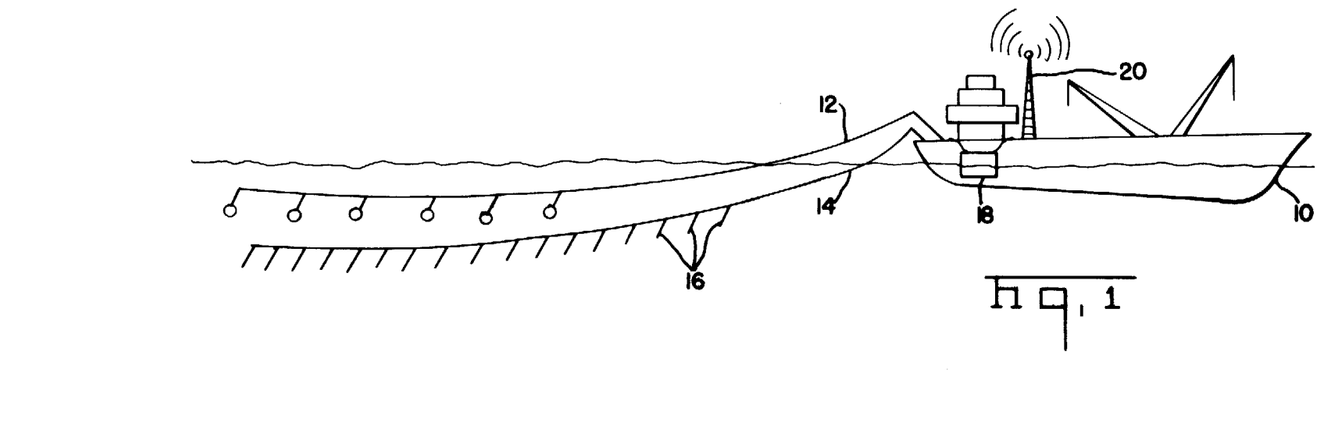
FIG. 1 represents a schematic view of the exploration vessel and its trail of acoustic energy detectors.

Referring now to FIG. 1, an overall view of seismic exploration vessel trailing acoustic energy detectors according to the invention is shown. The vessel 10 is provided with a plurality (in a preferred vessel, 40) sources 12 of acoustic energy which may comprise compressed air storage tanks or "guns" which may be rapidly emptied into the water, thus providing a wave of acoustic energy (a "shot"). The acoustic wave travels through the water in all directions and, in accordance with the well-known properties of waves in general, is partially reflected at all interfaces between media of different density through which it travels. For example, a large fraction of the wave is reflected when the wave reaches the ocean floor, the difference in density between water and the rock of the ocean's floor being comparatively great. Some of the wave continues into the sea bed and a further fraction is reflected at the first interface between layers of rock of varying density while the remainder continues on; eventually the power of the acoustic wave is exhausted and no further reflection occurs. The reflections passed back through the sea bed and the water are detected by acoustic energy detectors 16 which are trailed by the vessel 10 on a streamer 14. In the preferred embodiment there are up to 208 acoustic energy detectors (i.e. traces) 16 on the streamer 14. As discussed above, the more acoustic energy detectors 16 are present, the more data is gathered and the more accurate a picture can be generated of the topography of the subsea structure. The methods used to generate the picture of the topography of the subsea structure are well-known and will not be discussed here. Suffice it to say that the aim of the art is to remove the acoustic and electrical noise from the signals and to sum the signals, suitably time-delaying them to compensate for the additional length of travel of the acoustic wave from one end of the streamer to the other end and for the curvature of the streamer in the water behind the vessel, so as to provide an accurate picture of the topography of the subsea bed which can be analyzed by trained geophysical personnel in an attempt to locate subsea structures known to be conductive to the accumulation of oil and gas.

As discussed above, the acoustic energy detectors 16 are typically piezoelectric detectors which output a voltage dependent on pressure variations on the piezoelectric crystal. The analog voltage thus produced is passed by wires along the streamer 14 onto the vessel 10 where it is stored in data storage means 18. Simultaneously, navigational information is stored, which may be received by means of an antenna 20, from shore based radio stations, satellites and the like and which can also be used to navigate the vessel 10. Additional navigational data is input to the data storage means 18 from the vessel's navigational system, including various forms of radar and sonar, gyroscopic information, Doppler sonar, navigational equipment, and all other forms of modern navigational aid. This information is stored along with the seismic data, in a matter to be described hereinafter, so that the persons analyzing the seismic data have this information at their ready disposal.

Figure 2:
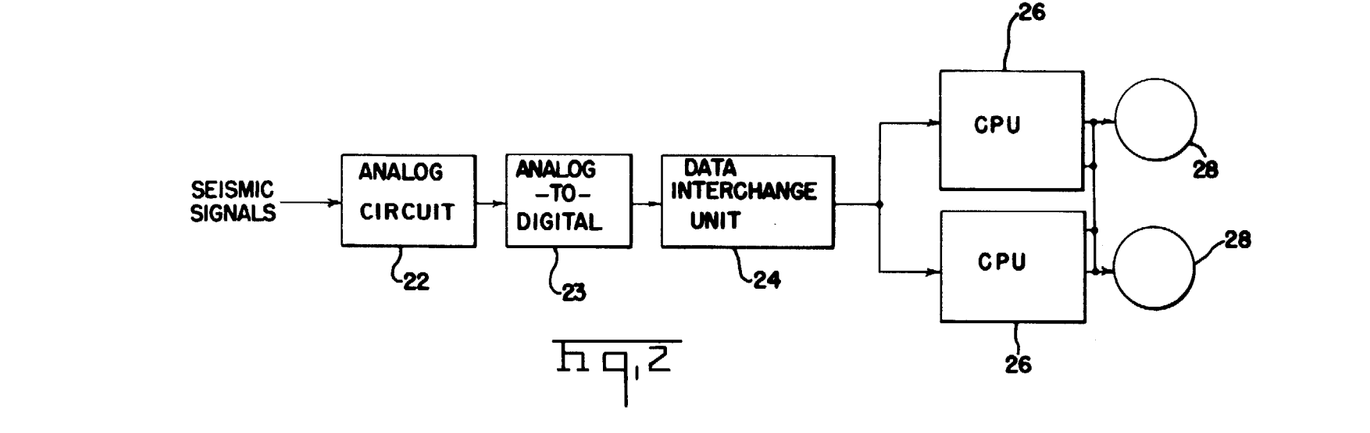
FIG. 2 represents an overview of the data processing system according to the invention.

Referring now to FIG. 2, a schematic diagram of the main components which make up a seismic data detection and storage system according to the invention are shown. Seismic signals are shown being passed first into analog circuit unit 22. Since the signals are at this point still in analog form, they can be processed, using conventional circuit elements, for such operations as impedance matching of the signals from the far end of the cable with those from the near end. Additionally, scaling may in some cases be desired so that some of the signals may be summed up to provide an instantaneous picture of the broad outline of the subsea formation. Further, in some cases it may be desirable to provide filtration of the signals at this point while they are still in analog form. The signals are then passed to an analog-to-digital converter 23. The conversion of the analog signals to words of digital data is done by sequentially sampling each of the plurality of incoming signals at fixed intervals and generating a digital representation of the instantaneous amplitude of the signal. In the preferred embodiment as discussed above, there are 208 incoming signals, each of which are sampled every 4 milliseconds, or 250 times per second. In a typical shot, the signals are recorded over a period of time on the order of six seconds, during which each signal would be sampled 1,500 times. It will be understood that the 1,500 samples of each signal thus generated are adequate to provide a good representation of the analog signal, as this analog signal is relatively simple and of low frequency compared to, for example, the analog signals which occur in such applications as music reproduction; the typical analog to digital sampling rate used in such high-fidelity applications is much higher, on the order of 250 kHz.

It will be appreciated that the output of the analog to digital converter 23 is a series of digital words, each representing the instantaneous amplitude of a different signal than that preceding and following. That is, the series is a multiplexed one, serial by time of detection. The eventual goal of these digital signals, of course, is to be processed in computers for producing a picture of the subsea formations. The programs used to process this data to yield these pictures can be run at higher speeds if they are designed to operate on data wherein succeeding words of the digital data correspond to the successive samplings of the same acoustic energy detector. For this reason the digital words coming from the analog to digital unit 23 are rearranged in central processing units (CPU's) 26 to a serial-by-trace format rather than serial by time of detection. To this end, a data interchange unit 24 is provided which adds header information to the signals and passes them onto a common bus from which the CPU's 26 select them in accordance with a method detailed below. These signals may be selected on an alternating, odd/even basis, every fourth signal, or otherwise, as desired. The advantage of providing two or more computers 26 wherein the data is alternatingly selected and processed by one or the other is that in this way smaller computers can be used; and if additional capacity is required, further small CPU's 26 can be added with minimal cost or expense. If a single, larger computer is used and later proves to be inadequate, it must then be replaced with an even larger one. Since, in general, the programming required for different computers is also different, new programs are required if new computers are to be used. By comparison the additional smaller computer 26 requires minimal reprogramming. Furthermore, additional small computers can be slave computers to a master computer; in this way very little reprogramming is required. In fact, where two CPU's are used, as shown in FIG. 2, one can be a master and the other a slave.

An additional advantage provided by the use of multiple computers will be disclosed in further detail below: that additional computers used to generate, for example, monitor chart information, can also serve as backups to the CPU's 26 in the event that they break down, if the plural small CPU's are used.

The primary function of the CPU's 26 in the system of FIG. 2 is to rearrange the data into a serial-by-trace format useful in the eventual computations performed on a computer. Once reorganized the data is stored on tape units 28.

Figure 3:
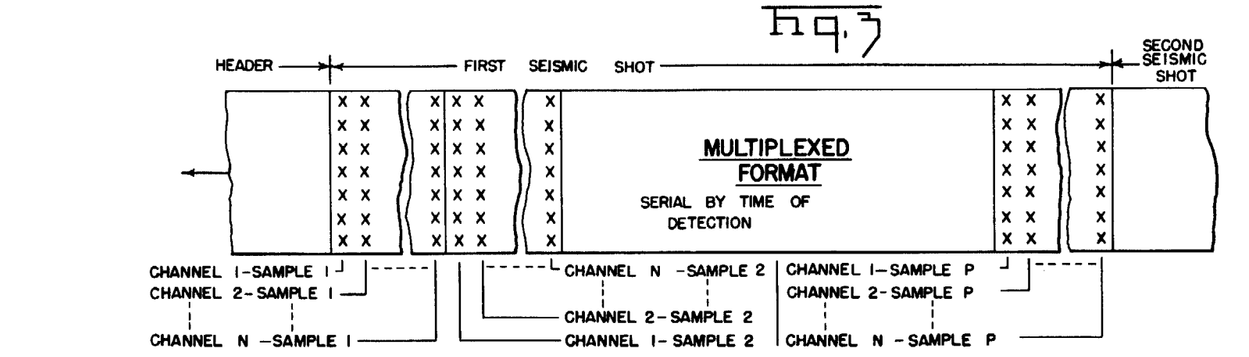
FIG. 3 represents the multiplex format in which the seismic data is originally generated.
Figure 4:
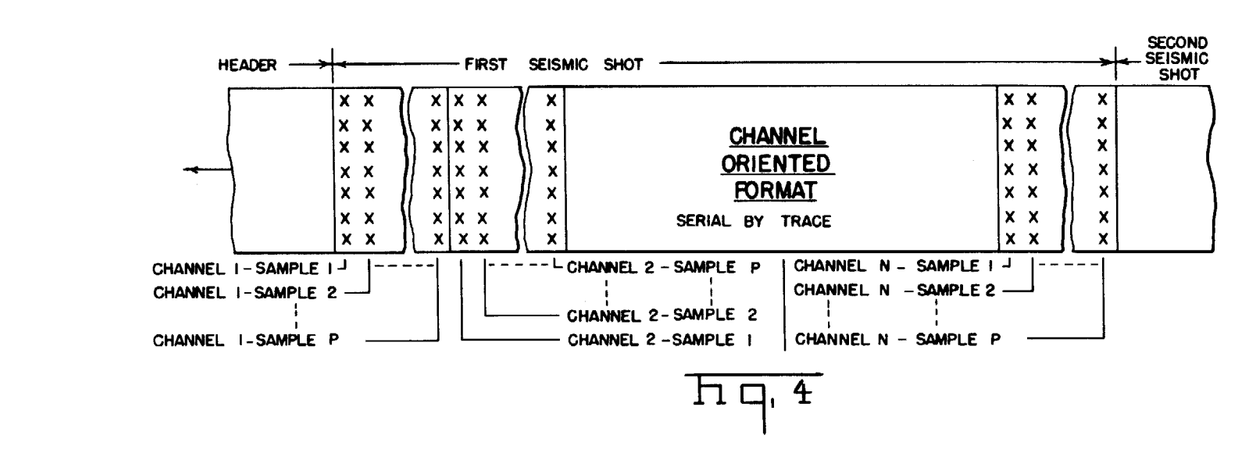
FIG. 4 represents the channel oriented format into which the seismic data is rearranged for later computation.

FIGS. 3 and 4 show, respectively, the multiplex serial-by-time-of-detection format in which the seismic data is passed to the data interchange unit and the channel-oriented, serial-by-trace format in which the data is stored on the tape reels 28 of FIG. 2, which is suited for the eventual computations to be performed on a home base computer.

In FIG. 3, a first seismic shot is depicted as containing samples from channels 1 through N—N being, in a preferred embodiment 208, corresponding to the number of acoustic energy detectors streamed behind the exploration vessel—each detector being sampled P times. Each individual vertical row of X's indicates a single digital word corresponding to one measurement of the instantaneous signal voltage of a given acoustic energy detector. In the preferred embodiment, any one of a number of digital formats may be used in the storage of these words; the format chosen may likewise vary in the number of bits making up each individual word. The selection of a format can be made in accordance with well-known prior art teachings.

It will be observed that the format shown in FIGS. 3 and 4 is arranged as if the tapes symbolized therein were traveling from right to left, on the drawing; that is, in the direction indicated by the arrow at the left of the figures. Header information is first recorded indicating that navigational and other data parameters relating to the circumstances under which the seismic data is recorded, as discussed above, and is followed by the seismic data. The first recordation is channel 1, sample 1, then channel 2, sample 1, and so on through channel N, sample 1. This means, of course, in the detection of the first sample that each acoustic energy detector is sampled in turn, the instantaneous signal voltages than being converted into digital representations which are sequentially stored. After all the dectectors have been sampled, (which are discussed above may take 4 msec.) the analog/digital converter returns to channel 1 to begin taking the second sample, and proceeds to again sequentially sample all the acoustic energy detectors, working from channels 1 through N. The process continues until the time of taking samples has been concluded with sample P. The operator then has the option to once again fire the compressed air guns, thus generating a second seismic shot, and to detect the echoes of the acoustic wave from the subsea bed.

FIG. 4 indicates how the multiplex format of FIG. 3 is desirably reorganized to present all the samples of each channel together, which as discussed above, is the desired format in which to present this data to a land-based computer for noise removal and other data processing techniques. The header information is precisely the same in both the multiplex format of FIG. 3 and in the channel oriented format of FIG. 4. It is the seismic samples themselves which are reorganized. As indicated in FIG. 4, the first area of the tape first contains all samples, 1 through P, of channel 1; then come samples 1 through P of channel 2, and continuing through samples 1 through P of channel N at the end of the recordation of the first shot.

The specific means used to reorganize the data from the multiplex formats of FIG. 3 to the channel-oriented, serial by trace format of FIG. 4, do not form a part of the present invention. In a preferred embodiment, however, the means used to reorganize this data are those described in commonly assigned U.S. Pat. No. 4,016,531 referred to above. Essentially what is disclosed therein is that the data is written onto magnetic disc in a nonsequential fashion and then is read therefrom in a sequential fashion so that it may be read in a serial by trace format and stored on tape in this serial by trace format. This reformatting process is fully disclosed in the U.S. Pat. No. 4,016,531 referred to above.

Referring now to FIG. 5, an overall schematic view of the seismic data detection and recordation system of the invention is shown. Analog seismic signals are shown being brought (in the serial-by-time-of-detection format of FIG. 3) into an equalizer and signal conditioner 30. In this unit the impedance of the various signals is matched since those coming from a long distance have a much higher impedance than those from a short distance. The signals may also be conditioned. This equalizer and signal conditioning unit 30 may comprise a DSS-V unit made by the Seismic Engineering Co. of Dallas, Texas.

The pressed signals are then divided into four substantially equal parts, each of which is sent to one of four analog modules 31, 32, 33, and 34. The control module 36 controls modules 31–34. In the analog modules, as will be more thoroughly explained hereinafter, the signals are further processed and are converted from analog into digital signals. In the preferred embodiment, as discussed above, 208 seismic signals are generated; of these, numbers 1 through 60 are processed by analog module number 1, 61 to 120 by analog module number 2, 121 through 180, by analog module number 3 and the remainder, 181 to 208, by analog module number 4. Control module 36 directs these signals to one of tape drives 37 or 38 for short term storage in the event that, should the remainder of the system develop a problem, the signals are not lost. A digital-to-analog converter 42 and a camera, or electrostatic oscillograph, may also be connected to the control module 36 for a real time picture of one or more of the incoming signals, so that the operator can get an idea of what the signals look like.

The four analog modules 31–34 and the control module 36 and tape drives 37 and 38 make up what is known as a DFS-V unit recorder 40, which is a standard item manufactured by the Texas Instruments Company.

From the DFS-V 40, the data is then passed to a data interchange unit 50. This data interchange unit 50 controls the flow of data in the system. It is here that navigational data, labeled 52, comes in, and is joined together with the seismic date to provide a complete record comprising header and seismic data information. Similarly, the data interchange unit takes the navigational data 52 and generates shot control commands 56 for the firing of the compressed air guns which are the source of the acoustic energy measured by the acoustic energy detectors. The data interchange unit 50 may be so designed that the shots are fired at equal distance intervals or equal time intervals depending on the selection made by the operator.

The data, including both seismic and header data, is passed onto a common data bus 63, from which the CPU's 60–62 select data for processing according to the counting arrangement detailed below. In the preferred embodiment, as shown in FIG. 5, two of the CPU's are provided, but the scope of the invention is not so limited. A plurality of central processing units or computers 60–62 can be provided, depending on how much data is available to be processed.

The CPU 60 is used to control the flow of data and the reformatting of it from the serial by time of detection format of FIG. 3, into the serial by trace format of FIG. 4 as described in U.S. Pat. No. 4,016,531. Essentially the two CPU's 60, 62, send data, by means of a multidisk transfer switch 64 to one of a number of short term disc storage units 65–68. In general, each of the CPU's 60–62 will have one of the discs 65–68 essentially dedicated to it by the multidisc transfer switch for the duration of a run, which might comprise a large number of seismic shots extending over several days. However, an additional pair of discs are provided in the preferred embodiment shown in FIG. 5 for backup memory should such be necessary. As described in U.S. Pat. No. 4,016,531, under the control of the CPU's, the data is taken from the data interchange unit and written nonsequentially onto one of the discs 65–68 and is then read sequentially by the CPU's and fed via formatters 70 and 72 onto one of long term data storage tape transport units 73, 74, 75, or 76, in the sequential serial-by-trace format shown in FIG. 4. These tape transports 73 to 76 thus do the actual recording of the data in the desired serial by trace format under the control of the computers 60 to 62.

The data, having been alternated between the two computers 60 to 62, must be recombined in one of the two formatters 70 or 72 when the data is being recorded so that it is all stored on a single reel of tape. This is done under the control of the CPU's 60–62. Desirably one of two or more CPU's 60–62 is a master, the remainder being slave CPU's so as to simplify this "interleaving" process.

A printer 59 and a CRT terminal 57 may also be attached to the CPU's for operator control, for error messages, and for other well known purposes.

Desirably a third CPU 80, referred to as the "Monitor CPU" is also connected to the formatters 70 and 72. These formatters are so designed that it is possible to read the data from the formatter after it has been written onto the tape transport. In this way under the control of monitor CPU 80, a monitor 82 can actually provide a real time picture of what is being written onto the tapes mounted on transports 73–76. In this way, as will be apparent to those skilled in the art, the operator is provided with an extremely useful trouble shooting tool. A detailed description of the operation of Monitor CPU 80 and of the chart generated by monitor chart unit 82 are found in copending application Ser. No. 118,162.

Connections are also desirably provided in order to allow the monitor CPU 80 to function as a backup CPU for both CPU's 60–62 in the event that one of these "goes down" due to any one of a number of problems. Preferably, a back-up CPU will be provided to perform this function. It will be apparent in this connection that it is useful to have all CPU's be the same. Not only do they then "speak the same language" but they are also readily substituted for one another in case of trouble. Similarly, if it is desired to enlarge the computing capacity of the entire system, it is a comparatively simple matter to add a third or fourth identical CPU. In a preferred embodiment of the invention, all CPU's are Texas Instrument model 980B computers.

It will be apparent to those skilled in the art that while two formatters 70 and 72 are provided, each controlling two tape transports 73 and 74, 75 and 76 respectively, for a total of four tape transports 73–76, at any given time only one of the formatters and one of the tape transports is in use. The additional capacity is provided to allow continuous operation while the tapes are being changed, which as mentioned above must occur approximately every 11 minutes while the seismic data is being taken, and also if one of the tape transports 73–76 should develop a fault. Today's tape transport technology includes error checking means so that the operator is aware of whether the data is being written onto the tape properly. In addition, as discussed above, a monitor 82 is provided which provides a physical picture to the operator of the data which is being written onto the tape. In this way, it is known whether or not the tape transport in use is performing satisfactorily and the additional tape transports are then available for use if there is a problem. In this connection, it will be apparent to those skilled in the art that it is desirable that the monitor 82 operate in real time. This is in fact done. The monitor 82 prints out a chart indicative of the signals being stored on a tape transport 73 to 76 in real time; that is to say, while the shot is being taken, as soon as the records are rearranged, they begin to be printed out on the monitor chart so that the operator has a clear and realistic picture of the data which is being written onto the tape transports. Desirably the chart is an electrostatic one, having sufficient electrodes so as to permit the printing of data at a rate comparable to the rate at which it is input. In a preferred embodiment, the chart is provided with some 1,836 electrodes spaced 100 to the inch thus providing an 18 inch wide chart having the capability of printing out some 7.2 seconds of data (at a 250 Hz sampling rate) for an unlimited number of acoustic signals. As mentioned above, the specific details of the programming of the monitor CPU 80 and of the chart printed out are the subject of co-pending application Ser. No. 118,162.

Figure 6:
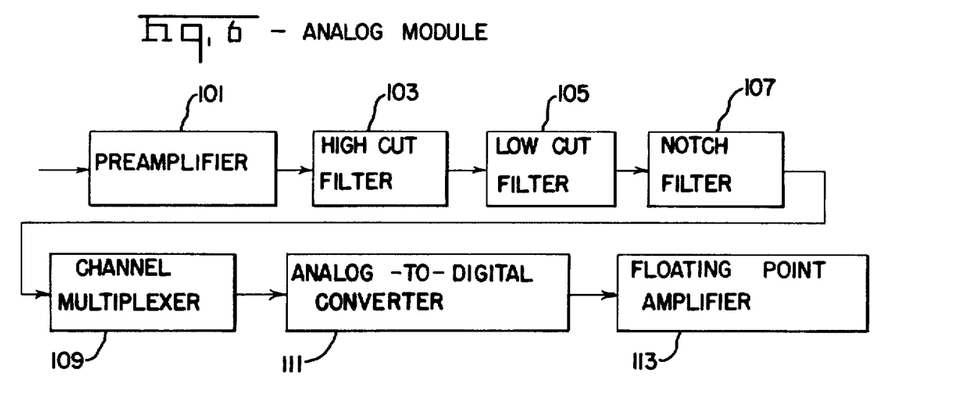
FIG. 6 represents an enlargement of an analog module, which is a part of the system shown in FIG. 5.

Referring now to FIG. 6, the main components of an analog module, which as discussed above is one of the four contained in the Texas Instruments DFS-V recording system, is shown. The signals are passed first to a preamplifier 101, through a high cut filter 103 and a low cut filter 105, and a notch filter 107. The purpose of all these is to prepare the signal for proper and accurate conversion to digital format. Each of the signals is passed to its own preamplifier, high cut, low cut, and notch filters so that in a preferred embodiment there are 240 of each of these components 101 to 107 contained within the model DFS-V. Within each of the four analog modules contained therein, however, there is also contained a channel multiplexer 109, an analog-to-digital converter 111 and a floating point amplifier 113. Channel multiplexer 109 is controlled by the control module 36 (FIG. 5) to select which of the signals is being sampled at a given time. As discussed above, the plurality of signals input into the analog module are cycled through once every four milliseconds, or 250 times per second, in order 1 through 60, in the case of analog module number 131. From the channel multiplexer 109, the signals are then passed to analog-to-digital converter 111 where they are converted from an analog representation of the instantaneous amplitude of the wave form to a digital representation thereof, which may be in any convenient digital format. In the preferred embodiment, the format chosen comprises 15 data bits, a sign and three gain bits in an integer floating point format. This is convenient for amplification in floating point amplifier 113, which operates merely by changing the gain bits. The scaling thus provided, which is more fully discussed in commonly assigned U.S. Pat. No. 4,084,151, can be used to make the digital representation of the signals correspond to a smaller number so that a number of these signals can be summed to provide an output for the camera 44 (FIG. 5) so as to provide the operator with a real time representation of the signals from any one of the analog modules.

Referring now to FIG. 7, the system is again shown in total with more detail shown particularly as to the data interchange unit 50. The data interchange unit 50 is shown as receiving input data from a navigational computer 90, to which may be connected an operator keyboard 95, seismic signals via the DFS-V 40 and streamer, fathometer and navigational data, and outputting combined header and data signals to the two CPU's, A and B, one of which may be a master and the other a slave. The data is then reorganized and reformatted as discussed above by the two CPU's 60 and 62 and stored on a magnetic tape mounted on one of the tape transports 73 to 76, also as discussed above. Additionally, a monitor computer and chart recorder may be provided as discussed above. The data interchange unit 50 performs two essential functions in the system of the invention. It collects the data which makes up the header, which is generated in a header formatter 92 under the control of a programmable read-only memory (PROM) 92 which controls the addressing and the ordering of the header information, and combines the header and seismic data in a header and data combiner 94, for outputting the composite onto bus 63, from which the CPU's 60-62 select it for processing.

Figure 7:
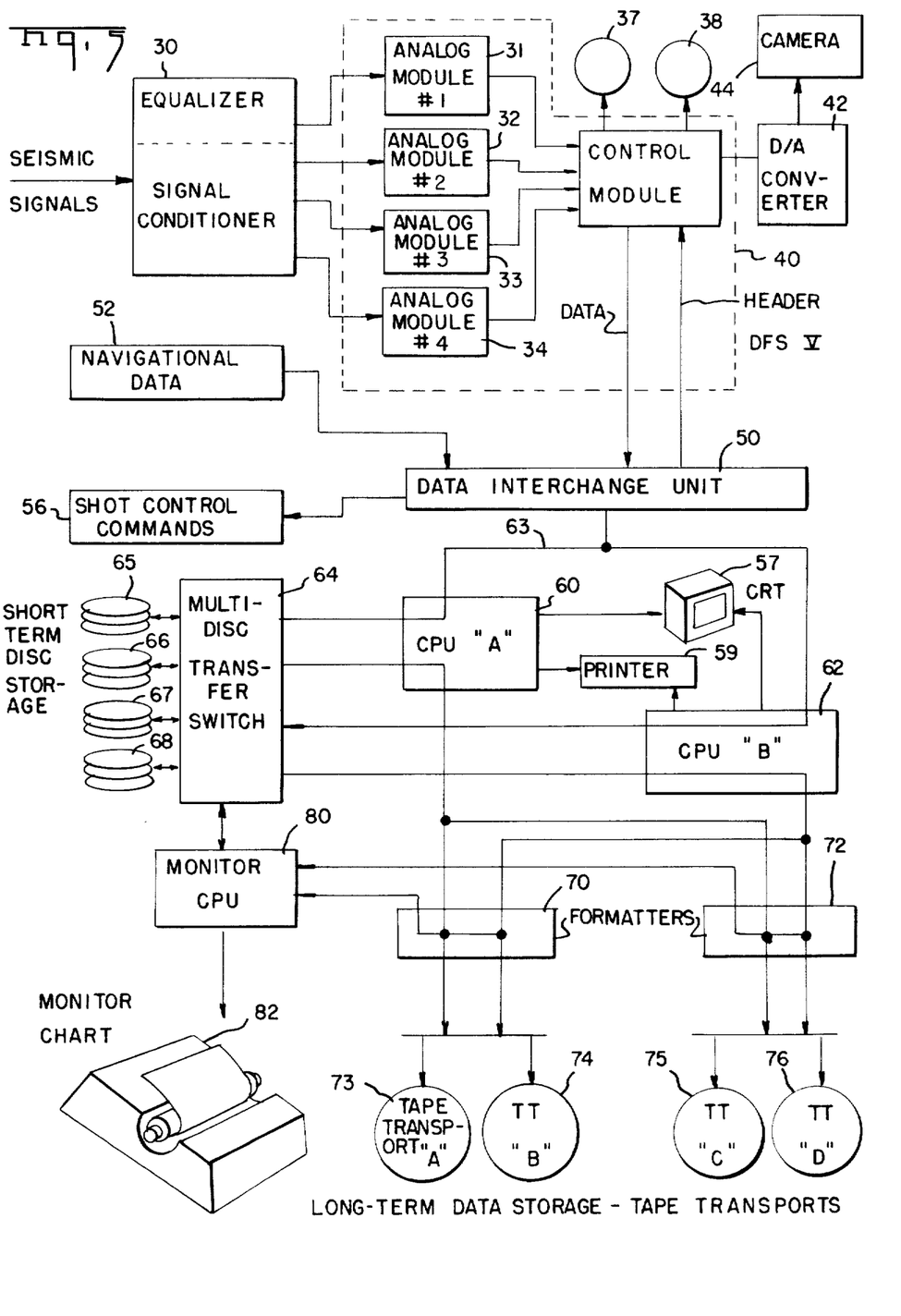
FIG. 7 represents an enlarged schematic view of the data interchange unit shown in FIG. 5 and the interconnections thereof with the remainder of the system of the invention.

Navigational data gathered from a variety of sources including radio stations, satellite navigational aids, loran, radar, sonar, and a wide variety of other navigational equipment is all collected in a navigational computer 90 which directs the ship according to the operator's desires. The data is also passed from the navigational computer 90 through the data interchange unit 50 to firing control unit 96 which controls the firing of the guns 12 on time or on distance as discussed above. This shot data, along with the navigational data, is passed to header formatter 92 which as discussed above stores this information in a predetermined format controlled by PROM address controller 91 and causes it to be written onto the tapes carried on tape transports 73 to 76 so that a geophysicist can later identify exactly where and under what circumstances the shot was taken. Additionally streamer data, which comprises information regarding the depth at which the detectors are streamed, their relative location with respect to the ship and the like, is also passed to header formatter 92 and becomes a part of the header information, again so that the geophysicist can have full information from which to draw his conclusions regarding the subterranean formations shown by the seismic data gathered by the system of the invention.

The system may also be provided with an operator keyboard 95 feeding to the navigational computer 90, or to one of the other computers, at which the operator can add any comments to the record he considers pertinent. For example, sometimes other vessels in the area of the seismic exploration vessel generate noise which might otherwise be confusing to the geophysicists interpreting the data. In such a case, the operator can then add a note to the header information to the effect that some of the noise is generated by another ship and may add all information he deems pertinent so as to eliminate this source of confusion. Again, this becomes a part of the header information applied to header formatter 92 and written onto a tape carried on one of the tape transports 73-76. It will thus be appreciated by those skilled in the art that the data interchange unit 50 is important to the system of the invention. Data interchange unit 50 assembles the entire record comprising both header and seismic data and permits all information pertinent to the circumstances under which seismic record was made to be recorded on the same type as the record. This common record is then output onto a bus 63 to which any desired number of CPU's 60-62 may be connected, to increase the system's processing power.

Figures 8, 9:
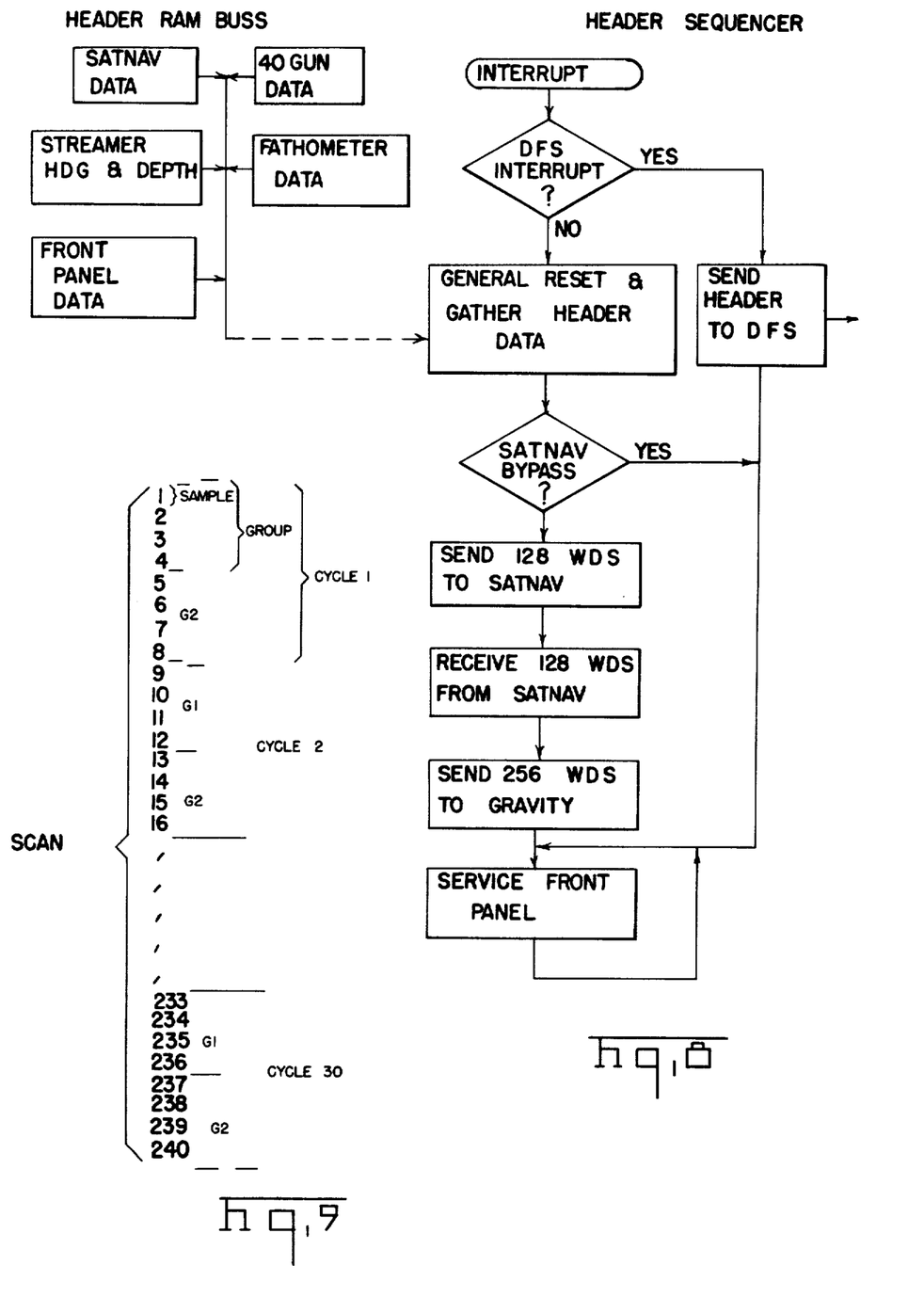
FIG. 8 is a flow chart of the header assembly process.
FIG. 9 is a diagram showing how a single scan is broken down for processing.

FIG. 8 shows a flow chart of the assembly of data by the header sequencer unit in order to provide header information to the digital record. A header ram bus accumulates data from the navigational computer (abbreviated SATNAV in this drawing) information with respect to the streamer heading and depth, data relating to the operational state of the data storage system ("front panel data"), data from the 40 guns used to generate the seismic wave detected and fathometer data indicating the depth of the water. This bus is connected to the header sequencer unit which operates according to the flow chart which forms the right half of FIG. 8. As will be seen, the flow chart indicates that the header sequencer interacts with the navigational computer and with "gravity" (gravimetric measurements) until the entire header is generated at which time it is sent to the DFS-V unit which returns it to the navigational computer as is indicated in block diagram in FIG. 7. The thus-generated header is combined with data in header and data combiner unit 94 (FIG. 7) and is then passed thence to the CPU 60 to 62.

FIG. 9 shows how the individual digital words of a single scan (that is a 4 millisecond sampling along each of the traces) are handled. If there are 240 individual samples, these are divided into "groups" of four, two of which make up a "cycle" in the embodiment shown where there are two CPU's 60 and 62. Where there are three computers, there would be three groups per cycle, if four CPU's, four groups per cycle and so on. The arrangement is useful in the implementaion to be discussed below in connection with Texas Instruments model 980B CPU's. If other computers are used, perhaps other considerations might be relevant, but the use of a plurality of computers is in general within the scope of the present invention. Thus, in FIG. 9 it is shown how the first four samples become a group which is selected by e.g., the master CPU. The second four samples, numbers 5-8, become part of group II of cycle 1 and are selected by the slave CPU and so forth until the entire 30 cycles have been passed and all the data from a first scan has been processed by the CPU's as discussed above. At this time, the procedure begins anew.

The following is a series of instructions to be used by a programmer skilled in the art having available to him the Texas Instruments' Model 980, Computer Assembly Language Programmer's Reference Manual and Texas Instruments Model 980 Computer Assembly Language Input/Output Manual both of which are incorporated herein by reference. With this information, a skilled programmer can cause CPU's 60 and 62 to operate as discussed above and select the appropriate digital words from the common data byte 63. The following CPU interface specification refers to a plurality of 16-bit words which are the control signals for the model 980 B computers as will be understood by those skilled in the art.

CPU INTERFACE

A. ATI WORDS
1. WORD 1

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| ATI | | OP | | CODE | | | | O | S | I | N | C | PORT | | |

| | | |
|---|---|---|
| ATI OP CODE: | | The OP code for ATI word 1 is hexadecimal "D9". |
| S | S = 0 | Allow DFS V tape to run. |
| | S = 1 | Inhibit DFS V tape. |
| R | R = 0 | A record is to be acquired from DFS V input. |
| | R = 1 | A record is to be acquired from DFS V tape transport. |
| N | N = 1 | Used only to command controller to store status. Status is stored without interrupts and normal controller operation is not affected |
| C | C = 1 | Unconditionally clear controller. |
| X | Unused bit | |
| I | I = 1 | Increment DFS V record number. |
| | I = 0 | Hold record number. |

2. WORD 2 - used only if bits N and C are zero

| 0 | 15 |
|---|---|
| INPUT COMMAND LIST ADDRESS | |

B. INPUT COMMAND LIST
1. LIST WORD 1 - Starting Memory Address

| 0 | 15 |
|---|---|
| STARTING MEMORY ADDRESS | |

2. LIST WORD 2 - Transfer Count

| 0 | 15 |
|---|---|
| TRANSFER COUNT | |

(a) If list word three designates transfer of header information, the transfer count is for the number of 16 bit word transfers.
(b) If list word three designates transfer of data words the transfer count is the number of samples to transfer. One sample uses two 16 bit words.

3. LIST WORD 3 - Device Command Word (A)

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| I | K | C | D | S | SPG | | NOG | | | GN | | | SF | | |

| | | |
|---|---|---|
| I | I = 0 | Device stores status without interrupt. |
| | I = 1 | Device interrupts and stores status. |
| K | K = 0 | Device stores data samples in IFP format. |

-continued

CPU INTERFACE

|   |   |   |
|---|---|---|
| | K = 1 | Device converts IFP samples to a binary number. |
| C | C = 1 | Command list chaining is performed. |
| D | D = 0 | Header information is to be transferred to memory. |
| | D = 1 | Data samples are to be transferred to memory. |
| S | S = 0 | The list address is stored as the second word of status. |
| | S = 1 | The remaining transfer count is stored as the second word of status. |
| | SPG | The device controller divides each scan of data into segments containing the number of groups specified by the binary number contained in SPG. If the scan is not evenly divisible by the SPG number plus one, the last segment will contain the remaining groups |
| | GN | The device controller will select the group in each segment which corresponds to the binary number plus one specified by GN. |
| | SF | The device controller will scale data samples (shift right) the number of bits specified by the binary number in SF. |

4. LIST WORD 4 - Chaining Address

| 0 | 15 |
|---|---|
| MEMORY ADDRESS OF NEXT COMMAND LIST | |

(list word four is not used if Bit 2 of list word three is zero).

5. LIST WORD 5 - Words Per Sample and Samples Per Cycle.

| 0 | 5 6 | 15 |
|---|---|---|
| WPS | | SPC |

(List word five is not used if Bit 4 of list word three is zero)

WPS     The 6 most significant bits of this word are used to define the number of 16 bit words per sample. When the WPS value is zero the controller assumes a value of 64. The WPS value when used in conjunction with the SPC value and list word 6 specifies the number of sequential memory locations to be written before incrementing the memory address by the value of list word 6.

SPC     Bits 6-15 contain the sample per cycle information. These 10 bits define the number of sample increments to be added before starting another cycle. The new cycle starts at the memory address calculated by adding the words per sample to the starting address of the previous cycle. SPC = 0 is decoded as 1024.

6. LIST WORD 6 - Sample Increment

| 0 | 15 |
|---|---|
| S     SAMPLE INCREMENT | |

(List word 6 is not used if Bit 4 of list word three is zero.)

The sample increment value is added to the starting memory address of each sample to determine the starting memory address of the next sample. This is done for each sample of a cycle except the first sample. See SPC list word 5 for determining first sample of a new cycle.

| S | S = 0 | Data is to be transferred to sequential memory locations. |
|---|---|---|
| | S = 1 | List words 5 and 6 are used to scatter write data to memory. |

C. INPUT CONTROLLER STATUS WORDS

1. STATUS WORD 1

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| LT | 0 | 0 | 0 | HD | S | DS | EOD | T | 0 | 0 | P | B | 0 | 0 | OC |

LT = 1     The transfer of data specified by a command list has been completed and the controller has chained to a new list.

HD = 1     An attempt has been made to transfer header information using a data list or an attempt has been made to transfer data using a header list. The type of command list is defined by Bit 3 of list word three. (ABORTIVE)

S = 1     A sync error has occurred on data coming from the DFS V recording equipment. (ABORTIVE)

DS = 1     The DFS V has entered its record or reproduce cycle, header information will soon be available. (DFS START)

EOD = 1     The DFS V has completed a record or reproduce cycle; no more data will be entered by the

| | -continued |
|---|---|
| | CPU INTERFACE |
| | DFS V. |
| T = 1 | A timing error has occurred. The controller was unable to transfer data to memory soon enough and data has been lost. (ABORTIVE) |
| P = 1 | A parity error has been detected in an ATI word or list word (ABORTIVE) or an error has been detected in a data transfer from the DFS V to the input controller. |
| B = 1 | The device controller is processing a command list and has received an ATI before completing the present list. The ATI is ignored. |
| OC = 1 | A command list is completed and no chaining is indicated. Operation complete. |

Given the above specification, those skilled in the art will understand how the invention enables a plurality of computers to be connected to the single data bus, thus greatly increasing system processing power.

It will be understood that the embodiment of the invention described above is a preferred on which, however, may be subject to various changes, modifications or improvements yet still maintaining its benefits; therefore, the description given above should be considered as exemplary only and not as a limitation on the invention, which is more properly defined by the following claims.

We claim:

1. In a marine seismic exploration vessel having means for producing pulses of seismic energy and means for detecting seismic signals reflected from the earth's subsurface, a seismic signal recording system comprising:
   analog-to-digital converter means for converting the seismic signals produced after each pulse of seismic energy to digital traces in an exploration format;
   at least two digital computers each having means for converting the exploration format of said digital traces to digital records in a processing format;
   means for recording said digital records; and
   means for continuously alternating said digital traces of said analog-to-digital converter means to different ones of said computers so that capacity of said system for recording seismic records in processing format is increased.

2. The system recited in claim 1 further comprising a plurality of magnetic disc units providing random access memory for said digital computers; and
   a disc transfer switch for selectively connecting any one of said digital computers to any one of said magnetic disc units to transfer said traces and records between said computers and said disc units.

3. The system of claim 1 wherein said means for converting the exploration format of said digital traces comprises memory means.

4. The system of claim 3 wherein said memory means is accessed nonsequentially during writing of said traces into said memory means, and is sequentially accessed during reading, whereby said exploration format is converted to said processing format.

5. The system of claim 3 wherein said memory means comprises both core memory and magnetic disk memory means.

6. The system of claim 1 wherein said processing format comprises serial-by-trace recordation of said digital traces.

7. The system of claim 1 wherein said processing format further includes header information, whereby parameters relating to the location of said vessel at the time of production of said pulses may be recorded.

8. The system of claim 1 wherein one of said at least two digital computers is a master computer, the remainder of said computers being slave computers.

9. The system of claim 1 wherein each of said digital computers comprises disc memory control means.

* * * * *

UNITED STATES PATENT AND TRADEMARK OFFICE
CERTIFICATE OF CORRECTION

PATENT NO. : 4,323,990
DATED : April 6, 1982
INVENTOR(S) : James W. Goode et al

It is certified that error appears in the above-identified patent and that said Letters Patent are hereby corrected as shown below:

Column 7, line 13 "prcessed" should be —processed—.

Column 10, line 18 "92" should be —91—.

Column 15, line 22, "on" should be —one—.

Signed and Sealed this

Fifth Day of October 1982

[SEAL]

Attest:

Attesting Officer

GERALD J. MOSSINGHOFF

Commissioner of Patents and Trademarks